United States Patent
Ahnn et al.

(10) Patent No.: US 11,727,011 B2
(45) Date of Patent: Aug. 15, 2023

(54) DATA ANALYSIS TOOL WITH PRECALCULATED METRICS

(71) Applicant: Target Brands, Inc., Minneapolis, MN (US)

(72) Inventors: Joey Jonghoon Ahnn, Minneapolis, MN (US); Samrat Mitra, Karnataka (IN); Vijayalakshmi Karasani, Sunnyvale, CA (US); Gaurav Gupta, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 17/410,006

(22) Filed: Aug. 24, 2021

(65) Prior Publication Data

US 2023/0065790 A1 Mar. 2, 2023

(51) Int. Cl.
*G06F 16/245* (2019.01)
*G06F 16/2455* (2019.01)
*G06F 16/2458* (2019.01)
*G06F 16/242* (2019.01)

(52) U.S. Cl.
CPC ...... *G06F 16/24564* (2019.01); *G06F 16/244* (2019.01); *G06F 16/2423* (2019.01); *G06F 16/2462* (2019.01)

(58) Field of Classification Search
None
See application file for complete search history.

(56) References Cited

U.S. PATENT DOCUMENTS

| | | | |
|---|---|---|---|
| 8,473,480 B1* | 6/2013 | Hu | G06F 16/24 707/715 |
| 9,652,354 B2 | 5/2017 | Filimonov et al. | |
| 10,042,697 B2 | 8/2018 | Ahad | |
| 10,061,632 B2 | 8/2018 | Ben Simhon et al. | |
| 10,757,121 B2 | 8/2020 | Dasgupta et al. | |
| 2003/0122874 A1* | 7/2003 | Dieberger | G06F 16/904 715/764 |
| 2006/0173812 A1* | 8/2006 | Bahl | G06F 16/283 |
| 2017/0032015 A1* | 2/2017 | Shkapenyuk | G06F 16/283 |
| 2017/0063656 A1* | 3/2017 | Vidyarthi | G06F 16/29 |
| 2017/0364551 A1* | 12/2017 | Averbuch | G06F 16/288 |

(Continued)

FOREIGN PATENT DOCUMENTS

EP 3223486 B1 5/2020

OTHER PUBLICATIONS

Loom Systems: Product Overview, AIOps for IT Monitoring—Predict, prevent, and resolve IT incidents proactively, Nov. 2, 2020; 9 Pages.

(Continued)

*Primary Examiner* — Son T Hoang
(74) *Attorney, Agent, or Firm* — Merchant & Gould P.C.

(57) ABSTRACT

In the general, the subject matter of the present disclosure relates to a data analysis tool that helps consumers, such as data scientists and engineers, understand datasets better. The disclosed data analysis framework/tool surfaces metrics to data consumers to visually inspect and understand large datasets more efficiently. In addition to the pre-computed and pre-collected metrics on given datasets or tables, the disclosed data analysis tool may also provide a way to detect various anomalies associated with the datasets.

14 Claims, 8 Drawing Sheets

(56) References Cited

U.S. PATENT DOCUMENTS

| | | | |
|---|---|---|---|
| 2018/0225320 A1* | 8/2018 | Saini | G06F 16/215 |
| 2019/0050445 A1* | 2/2019 | Griffith | G06F 16/213 |
| 2020/0210393 A1* | 7/2020 | Beaver | G06F 16/2474 |
| 2021/0182699 A1* | 6/2021 | Koyyalummal | G06F 16/21 |

OTHER PUBLICATIONS

Crunch Metrics, AI-powered anomaly detection—Helping you focus on otherwise undiscoverable business incidents CrunchMetrics automatically teams 'normal behavior' from your past data, and identifies anomalies in real-time to enable instant actions), Nov. 3, 2020, 2 Pages.

Anodot, Anodot Autonomous Detection—Find a fix key business incidents as they're happening, 2019, 3 Pages.

Tableau Prep/Tableau Desktop, Turn insights into action with the Tableau product suite, Tableau Software, LLC, 2003-2020 (Printed Nov. 2, 2020), 8 Pages.

* cited by examiner

600

DATA ANALYSIS TOOL WITH PRECALCULATED METRICS

BACKGROUND

Analyzing large sets of data requires a fair amount of time. The analysis process is even more challenging in cases where the underlying data is dynamic in nature. Typically, consumers interested in understanding data sets run queries on data sets over and over again as the underlying data changes. In addition, consumers interested in identifying anomalies within large data sets may use a data validation approach that is based on user-defined rules that require row by row scan of the data set. The iterative process of running queries on large volumes of data poses challenges both in terms of computing resources and time. Further, the identifying rules and checks for an anomaly detection task can also be a tedious process due to the dynamic nature of the underlying data set.

SUMMARY

Embodiments of the disclosure are directed to providing users with greater control on how their data is handled by businesses.

In a first aspect, a method to analyze data is provided. The method includes receiving the dataset from one or more data sources; calculating one or more summary metrics associated with the dataset; storing the dataset and the summary metrics in a data store; receiving a request to detect any anomalies in the dataset; applying one or more anomaly detection criteria to the one or more summary metrics associated with the dataset; determining that one or more summary metrics violate at least one of the one or more anomaly detection criteria; and in response to determining that the one or more summary metrics violate at least one of the one or more anomaly detection criteria, determining that the dataset includes an anomaly.

In a second aspect, a data analysis system is provided. The data analysis system includes a processor; a memory storing instructions that when executed by the processor cause the processor to: receive the dataset from one or more data sources; calculate one or more summary metrics associated with the dataset; store the dataset and the summary metrics in a data store; receive a request to detect any anomalies in the dataset; apply one or more anomaly detection criteria to the one or more summary metrics associated with the dataset; determine that one or more summary metrics violate at least one of the one or more anomaly detection criteria; and in response to determining that the one or more summary metrics violate at least one of the one or more anomaly detection criteria, determine that the dataset includes an anomaly.

In a third aspect, computer implemented method for analyzing data is provided. The computer implemented method includes receiving a selection of a dataset for analysis; retrieving the selected dataset from one or more data sources; calculating one or more summary metrics associated with the dataset; storing the dataset and the summary metrics in a data store; generating a data analysis user interface for display on a user device, wherein the display includes at least a portion of the dataset and the calculated summary metrics for visual inspection from a user; receiving a request through the user interface to detect any anomalies in the dataset; applying one or more anomaly detection criteria to the one or more summary metrics associated with the dataset; determining that one or more summary metrics violate at least one of the one or more anomaly detection criteria; and in response to determining that the one or more summary metrics violate at least one of the one or more anomaly detection criteria, determining that the dataset includes an anomaly.

BRIEF DESCRIPTION OF DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
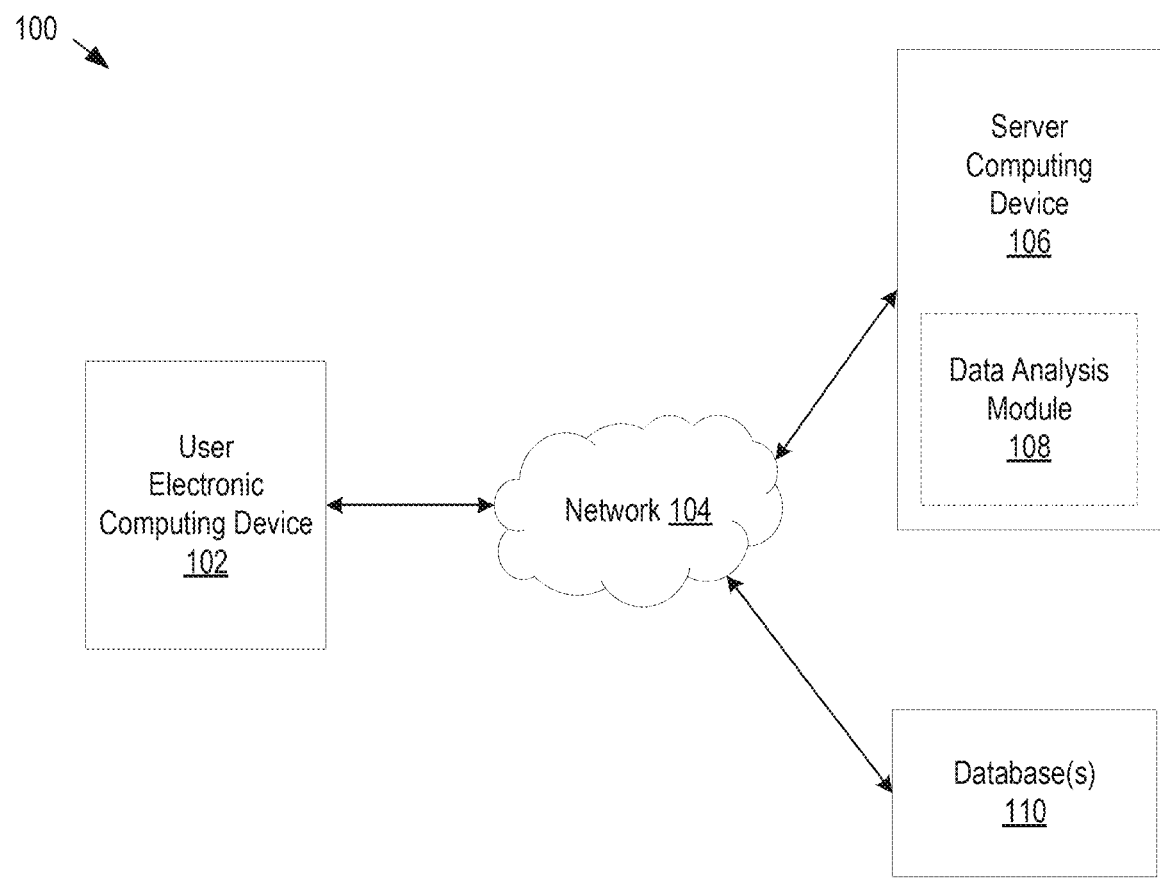
FIG. 1 illustrates an example system that supports the analysis of large datasets.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In the general, the subject matter of the present disclosure relates to a data analysis tool that helps consumers, such as data scientists and engineers, understand datasets better, and more efficiently. The disclosed data analysis framework/tool precomputes and surfaces metrics to data consumers to visually inspect and understand large datasets more efficiently. Example metrics may include min, max, median, percentile, standard deviation, correlation matrix, null count, zero value count, negative value count, etc. In addition to the pre-computed and pre-collected metrics on given datasets or tables, the disclosed data analysis tool may also provide a way to define various anomalies by the users.

In some examples, the data analysis tool may be configured to include an anomaly detection feature that uses user-defined anomaly detection rules in detecting anomalies rather than reading datasets record by record. Typical anomaly detection tools are configured to detect anomalies in data sets by analyzing normal data patterns over a period of time or analyzing historical data and closely monitoring data streams to detect any deviations from typical behavior or patterns. By contrast, the disclosed data analysis tool uses the pre-calculated metrics as a baseline for the anomaly detection rules. In other words, the anomaly detection rules may be based on the pre-defined, pre-collected and/or precomputed metric values rather than the raw data itself. Once the user-defined anomaly rules are keyed in, the data analysis tool may thereafter provide warning or error messages when one of the anomaly rules is violated.

For example, a user may set up a rule to make sure that the number of row count for a given table is larger than 1 million by setting up "1 million>min". Or a user may define a rule "5%>null count" to make sure that null count is not greater than 5%. An anomaly detection rule may then be created to check for violations based on the metric calculations on precomputed data statistics, rather than going through each row of the data set.

In some examples, the disclosed data analysis framework is scalable and easily extensible to any type of metrics-based anomaly detection. For example, the disclosed data analysis tool can simultaneously analyze a plurality of datasets stored in separate data tables.

In other examples, the disclosed data analysis tool can include a graphical user interface that provides an easy and data agnostic way for users to create, update, and/or delete anomaly rules. For example, the disclosed data analysis tool may include an interface to send alerts or warn users when an anomaly rule is violated. The alerts may be displayed internally, on a page within the data analysis tool or sent to an external medium, such as email, messenger, or other systems. The disclosed tool may also include a dashboard that allows users to analyze and investigate trends in anomalies with ease.

The technology described herein exhibits a practical application in that, compared to other data validation or anomaly detection tools in the market, the disclosed data analysis tool's metric based anomaly detection framework can be more efficient and light-weight since it does not require reading all the data records row by row in order to detect violations of the rules. For example, the disclosed data analysis tool may improve the operation of the computer by reducing the computing resources required to detect anomalies in large datasets at the time analysis is to be performed, because computing resources are not spent on analyzing data patterns or each data record one at a time. Instead, the disclosed data analysis tool can use computing resources efficiently in calculating anomalies in large dynamic datasets by precomputing and storing data metrics associated with the datasets and using the data metrics for quickly and efficiently determining the presence of data anomalies.

FIG. 1 illustrates an example system 100 that supports the analysis of large datasets. The system 100 includes a user electronic computing device 102, a network 104, a server computer 106 and one or more datastores 110. In some examples, the server computer 105 may include a data analysis module 108. More, fewer or different modules can be used.

In some examples, user electronic computing device 102 is an electronic computing device of the user. In some examples, the electronic computing device can be a desktop computer, a laptop computer, a mobile electronic computing device such as a smartphone or a tablet computer. The electronic computing device permits the user to access the server computer 106 over a network 104. The users of the electronic computing device may include data scientists and engineers who want to gain a deeper understanding of large datasets.

Although a single user electronic computing device 102 is shown, the system 100 allows hundreds, thousands, or more computing devices to connect to the server computer 106.

In some examples, the network 104 is a computer network, such as the Internet. The user on user electronic computing device 102 can access the server computer 106 via the network 104.

In a preferred example, the server computer 106 is a server computer of an enterprise or organization that handles large quantities of data. Although a single server is shown, in reality, the server computer 106 can be implemented with multiple computing devices, such as a server farm or through cloud computing. Many other configurations are possible.

In one example, the data analysis module 108 allows a user to analyze large datasets and to efficiently detect the presence of anomalies in the dataset by pre-calculating and storing summary metrics associated with the dataset. As discussed in more detail later herein, the data analysis module 108 generates a user interface display that may be displayed on the user electronic computing device 102 where the user may view datasets, create one or more summary metric calculation rules and data anomaly detection rules that may then be used by the data analysis module 108 to pre-calculate and store one or more summary metrics associated with the dataset and detect one or more anomalies associated with the dataset quickly and efficiently. The data analysis module 108 and the generated user interface are described in further detail in relation to FIGS. 2-5.

The example datastore(s) 110 may include one or more electronic databases that can store one or more data tables that includes data associated with the enterprise. The data stored in the example database(s) 110 may be retrieved by the data analysis module 108 via the network 104 to perform data analysis and anomaly detection functions. The datastore 110 may be maintained by the enterprise or organization itself or be maintained by one or more external, third-parties associated with the enterprise. The datastore 110 can be accessed by the server computer 106 to retrieve relevant datasets.

Figure 2:
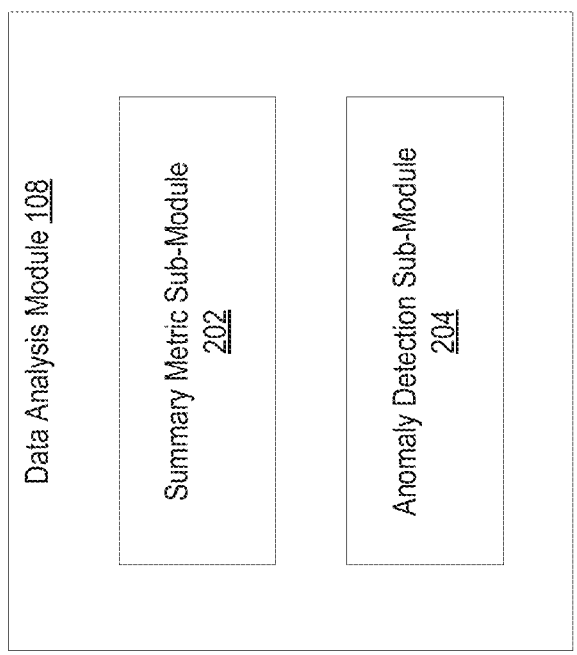
FIG. 2 illustrates an example configuration of the data analysis module of FIG. 1.

FIG. 2 illustrates an example configuration of the data analysis module 108. As detailed in relation to FIG. 1, the server computer 106 includes the data analysis module 108, which in turn may be implemented using one or more sub-modules.

In some examples, the disclosed data analysis module 108 may be configured to analyze datasets and detect the presence of one or more anomalies in a dataset by pre-calculating and storing summary metrics associated with the dataset. In some examples, the data analysis module 108 comprises a summary metrics sub-module 202 and an anomaly detection sub-module 204. More or fewer sub-modules may also be used to implement the data analysis module 108.

In some examples, the summary metrics sub-module 202 is configured to calculate one or more summary metric values associated with a data set. For example, the data analysis module 202 may generate a user interface display, displayed on the user electronic computing device 102, that allows a user to select a dataset for analysis. The user interface generated by the data analysis module 108 is described in detail in relation to FIG. 3.

In some examples. the selected dataset may include data from one or more data tables stored in one or more data stores 110. The data contained in the dataset be static or dynamic and be refreshed periodically. In an example where the enterprise is an online retailer of goods, the dataset may include data associated with sales, inventory, customer related data, etc. In other types of enterprises, other types of data may be included within the datasets.

In some examples, the dataset may include a plurality of columns of data that are all associated with a particular category or workflow. In other examples, the dataset may be organized differently.

In some examples, the user, through the generated user interface display may select to calculate one or more pre-defined summary metrics for the selected dataset. In other examples, the list of summary metrics may be standard. In yet another example, in addition to pre-defined summary metric options, the user may also be able to define a customized summary metric value that helps the user analyze the dataset. The user may define a summary metric and store the summary metric definition in a configuration file associated with the data analysis module 108. The created summary metric definition may be provided as one of the pre-defined summary metric options on the user interface display associated with the data analysis module 108 and available for the user to select.

In some examples, summary metrics may include one or more functions that when applied to the raw data from the selected dataset provides a summary of a property related to the dataset. Example summary metrics may include min, max, median, standard deviation, correlation matrix, null count, zero value count, negative value count, etc. For example, the min metric value may identify the minimum or lowest value among the dataset; the max metric value may identify the maximum or highest value among the dataset; the median metric value may provide the median value associated with the dataset; the standard deviation metric may provide the standard deviation value associated with the dataset; the correlation matrix metric provides a table showing correlation coefficients between the data entries in the dataset; the null count metric may provide a number of data entries within the dataset that do not include a data value; the zero count metric may provide the number of data entries within the dataset that include a data value of zero; the negative value count metric may provide a number of data entries within the dataset that include a dataset, etc.

In some examples, the summary metric sub-module 202 receives the dataset from the one or more data tables in the one or more data stores 110 and calculates the selected summary metric values for the selected dataset. For example, the calculated summary metric values may be displayed on the user interface display of the user electronic computing device 102 for the user to view and examine. In addition, the selected dataset and calculated summary metric values may be also be stored in a data store 110 for future analysis, including anomaly detection analysis.

In some examples, the anomaly detection sub-module 204 is configured to detect one or more anomalies associated with a selected dataset. For example, the user may create one or more validity rules associated with a selected dataset in order to detect anomalies in the dataset. For example, the user may create validity rules to check the validity of the data. In some examples, the created validity rules may be saved in a configuration file associated with the data analysis module 108. The example data validity rules may be created by the user using a script or may be selected by the user from a list of pre-defined validity rules.

Some examples of validity rules include rules to check that there are no null values in the dataset ("nullCheck"), rules to check that the values of the data entries in the dataset range between a first data value and a second data value ("rangeCheck"), rules to check that the minimum value of the dataset does not fall below zero ("negativeCheck"), rules to check that the value of the data entries in the dataset are of a certain string length ("stringLengthCheck"), rules to check that the value of the data entries in the dataset include a certain pattern of alphanumeric values ("stringRegexCheck"), rules to check that the values of the data entries in the dataset are all unique ("uniqueCheck"), etc.

In some examples, the user may select one or more of the pre-defined or custom defined data validity from the configuration file associated with the data analysis module 108. The anomaly detection sub-module 204 may apply the selected data validity rules to the summary metrics associated with the selected dataset in order to quickly and efficiently identify the data columns in the dataset that do and do not comply with the selected data validity rules. The anomaly detection sub-module 204 can identify any data columns from the data set that do not comply with the data validity rules as including an anomaly.

For example, a summary metric associated with a selected dataset may include a negative value count metric that lists the number of times data entries within a particular data column of the selected dataset includes a value that is below zero. When the user selects a "negative check" data validity rule to be applied to the dataset, the anomaly detection sub-module 204 can check the stored summary metric values associated with the dataset to check whether the negative value count metric has a value of zero (meaning there are no negative values within the data column of the dataset). If, however, the summary metric associated for the negative value count has a value over zero, the anomaly detection sub-module 204 determines that at least one value within the dataset was a negative value and thus at least one value within the dataset is anomalous.

In some examples, upon detecting an violation of a rule, or in other words, detecting an anomaly in the data, the anomaly detection sub-module 204 may generate an indication on the user interface to denote that the selected dataset or data column within the selected dataset includes an anomaly. In some examples, the indication of an anomalous value in the data set may be done through highlighting of the data set or data entry with the anomalous value, by using a letter or symbol to denote the presence of an anomaly within the data or may be done by indicating a text description explaining that a particular dataset or data entry includes an anomalous value. Other methods of indicating that an anomalous value was identified within a data column of the dataset are also possible.

Figure 3:
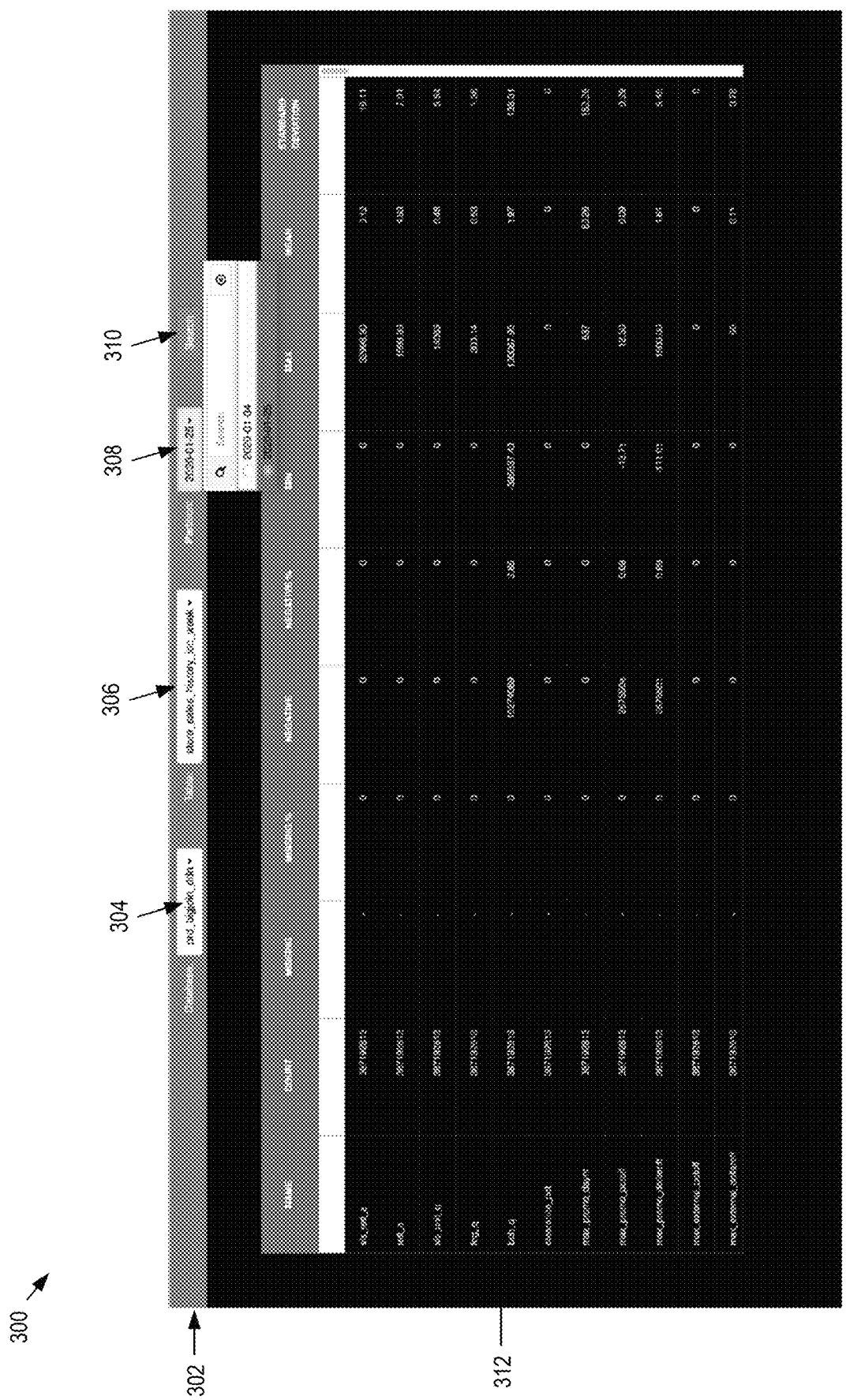
FIG. 3 illustrates an example user interface display of the data analysis module of FIGS. 1 and 2.

FIG. 3 illustrates an example user interface display 300 of the data analysis module of FIG. 2. The example user interface display 300 is generated by the data analysis module 108 implemented on the server computer 106 and displayed on the user electronic computing device 102 and is configured to display the summary metrics associated with a selected data set.

In some examples, the user interface display 300 includes a top banner 302 that includes one or more options related to the selection of the dataset for analysis. For example, the top banner 302 of the example user interface 300 may include a database input 304, data table input 306, a partition input 308 and a search button 310. More or fewer input options may be implemented on the top banner 302 of the example user interface 300.

In some examples, the database input 304 may be a drop down menu button that allows the user to select a database from a one or more of databases that are stored in the datastores 110 and accessible to the data analysis module 108 through a network connection. In other examples, the database input 304 may be a text box where the user may enter the name or another attributed associated with the database.

In some examples, the data table input 306 may be a drop-down menu button that allows the user to select a data table from one or more data tables that are stored within the selected data base 304. In other examples, the data table input 306 may be a text box where the user may enter the name or another attributed associated with the data table.

In some examples, the partition input 308 may be a drop-down menu button that allows the user to select a partition from the one or more data partitions associated with the selected data table 306. In other examples, the partition input 308 may be a text box where the user may enter the name or another attributed associated with the partition. In some examples, the data partitions may correspond to the data columns listed in one or more data tables.

In some examples, in response to the user making a selection on the database input 304, the options listed for user selection on the data table input 306 and partition input 308 are automatically updated. For example, upon the user selecting "database A" on the database input 304, the available options on the data table input 306 may be automatically limited to data tables that are stored within the "database A." Additionally, depending on the selected data table input 306, the partition input 308 drop down menu may be populated with only the partitions associated with the selected data table input 306.

In some examples, once the database input 304, the data table input 306 and the partition input 308 are populated with the user's selections for the dataset, the user may select the "search" button 310 to search for and load the selected dataset based on the input values 304, 306 and 308.

Once the selected dataset, based on input values of the database input 304, data table input 306 and partition input 308, is located, the dataset is loaded into the user interface display 300 as a dataset table 312. In some examples, dataset table 312 is configured to include a plurality of rows and columns. In other examples, the dataset table 312 may be organized differently.

In some examples, the data set columns include the name of the data column associated with the selected dataset followed by one or more summary metrics. For example, the list of summary metrics displayed on the dataset table 312 include all pre-defined summary metrics included within the configuration files associated with the data analysis module 108. If the user prefers to view more, less or different summary metrics than the ones listed by default, the user may be able to edit the configuration file and define the summary metrics according the user's preferences. In some examples, each of the data columns of the selected dataset is populated as a row, with each row listing out the values corresponding to the particular data column.

In the disclosed example from FIG. 3, the dataset table 312 includes the dataset columns: name, count, missing, missing %, negative, negative %, min, max, mean and standard deviation. Each of the rows of the dataset table 312 includes a name of a data column from the selected dataset followed by the data column's summary metrics value corresponding to the dataset column. For example, the data column with the name "sis_retl_a" includes the following summary metric information: count=387192813; missing=—; missing %=0; negative=0; negative %=0; min=0; max=32998.90; mean=3.12; and standard deviation=18.11.

Figure 4:
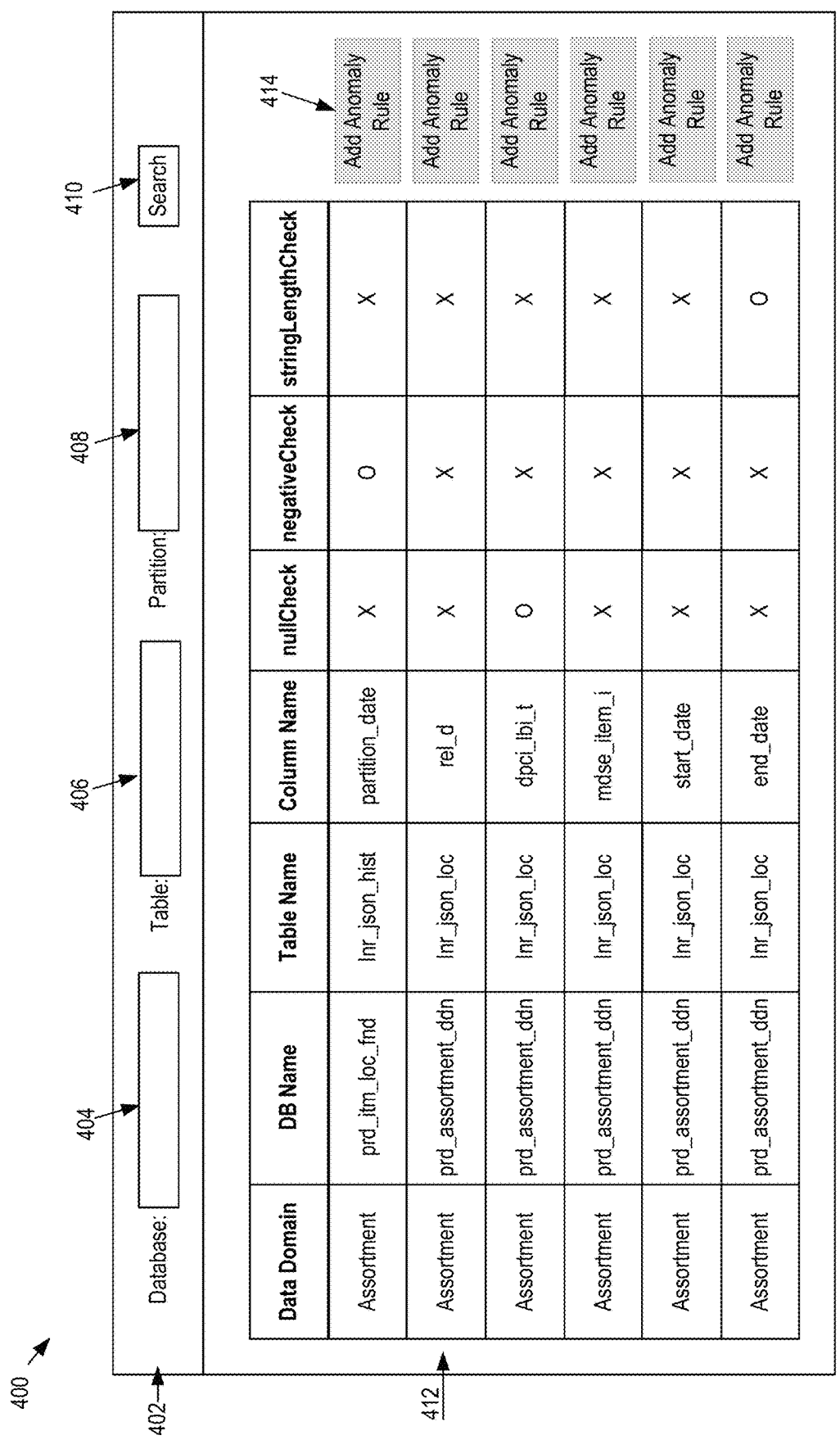
FIG. 4 illustrates another example user interface display of the data analysis module of FIGS. 1 and 2.

FIG. 4 illustrates another example user interface display 400 of the data analysis module 108. The example user interface display 400 is generated by the data analysis module 108 implemented on the server computer 106 and displayed on the user electronic computing device 102 and is configured to display whether anomalies were identified by the anomaly detection sub-module 204.

The example user interface display 400 is generated and displayed upon the user requesting a display of the anomaly detection feature. The request may be made through another user interface display input selection. Similar to the example user interface display 300, the example user interface display 400 includes a top banner 402 that includes one or more options related to the selection of the dataset for anomaly detection. For example, the top banner 402 of the example user interface 400 may include a database input 404, data table input 406, a partition input 408 and a search button 410. More or fewer input options may be implemented on the top banner 402 of the example user interface 400. The input options 404, 406 and 408 are configured similarly to the inputs 304, 306 and 308.

In some examples, once the database input 404, the data table input 406 and the partition input 408 are populated with the user's selections for the dataset, the user may select the "search" button 410 to search for and load the selected dataset based on the input values 404, 406 and 408.

Once the selected dataset, based on input values of the database input 404, data table input 406 and partition input 408, is located, the dataset is loaded into the user interface display 400 as an anomaly dataset table 412. In some examples, anomaly dataset table 412 is configured to include a plurality of rows and columns. In other examples, the anomaly dataset table 412 may be organized differently, e.g., using a set of name-value pairs to store data entries, or other types of data structures. In some examples, a selectable "add anomaly rule" option 414 may be displayed adjacent to each row of the anomaly dataset table 412 to allow the user to add one or more anomaly rules that may be executed on the corresponding set of data listed in the row of the anomaly dataset table 412 that is adjacent to the selected "add anomaly rule" option 414. Selecting the "add anomaly rule" option 414 may cause the display of a "add anomaly rule" window 500 that is described in greater detail in relation to FIG. 5.

After searching for and adding a set of data to the anomaly dataset table 412, the user may search for another set of data that is stored in the same or different database, data table or partition and add it to the anomaly dataset table 412. In other words, the anomaly dataset table is created by the user and can include data from heterogeneous data sources.

In some examples, the anomaly dataset table 412 includes a plurality of columns that include the data domain name, the data base name, the data table name, the column name and one or more anomaly detection criteria. In the disclosed example, the anomaly detection criteria include: nullCheck, negativeCheck, string LengthCheck. The list of anomaly detection test is pre-defined in a configuration file associated with the data analysis module 108. If the user desires to include more, less or different anomaly detection criteria, the user may be able to do so by editing the configuration file associated with the data analysis module 108 to include the desired anomaly detection criteria.

In some examples, the cells of each row of the anomaly dataset table 412 is populated with the data values corresponding to the respective column. In the disclosed example from the example user interface display 400, each row of the anomaly dataset table 412 includes: name of the data domain, name of the database, name of the data table and column name corresponding to a subset of the selected dataset.

In addition, each cell corresponding to each of the anomaly detection test criteria columns, such as the null- Check column, the negativeCheck column and the stringLengthCheck column includes a value of "X" or "0." In the disclosed example from example user interface display 400, a value of "X" indicates that no anomalies were detected for data domain/database/data table/column combination corresponding to the particular row of the anomaly dataset table 412 and a value of "0" indicates that at least one anomaly was detected for the data domain/database/data table/column combination corresponding to the particular row of the anomaly dataset table 412. Although the presence of an anomaly are shown using "X" or "0" in the disclosed example, other examples may include a different method to indicate the presence of anomalies, including a change in color, highlighting, text description, etc.

In the disclosed example, the dataset corresponding to: "Assortment" data domain, "prd_itm_loc_fnd" database, "lnr_j_son_hsit" data table and "partition_date" column may include an anomaly corresponding to the "negativeCheck." In other words, the dataset corresponding to: "Assortment" data domain, "prd_itm_loc_fnd" database, "lnr_j_son_hsit" data table and "partition_date" column includes one or more negative values in the data in violation of the anomaly detection criteria.

In some examples, the anomaly detection sub-module 204 of the data analysis module 108 may evaluate the pre-calculated and pre-stored summary metric values associated with a selected dataset for violations of the pre-determined anomaly detection test criteria that are saved in the configuration files rather than evaluating the entire raw data included within the selected dataset. Thus, the disclosed anomaly detection sub-module does not check each raw data value to determine whether the raw data is anomalous. Rather, the disclosed anomaly detection sub-module 204 evaluates the summary metric for violations of certain pre-determined anomaly criteria.

In one example, the method of determining that a dataset includes an anomaly may include checking whether at least one of the data values within the dataset includes a negative number. In such a case, the disclosed anomaly detection sub-module 204 may, instead of check each of the data values within the selected dataset, may simply check the pre-calculated and pre-saved summary metric values associated with the dataset to see if the "negative count" summary metric value includes a number higher than zero. Here, the "negative count" summary metric value include a count of the number data values within a dataset that includes a value below zero. For example, when the negative count summary metric value is "2," then the dataset associated with the summary metric value includes two numbers that are below zero.

Figure 5:
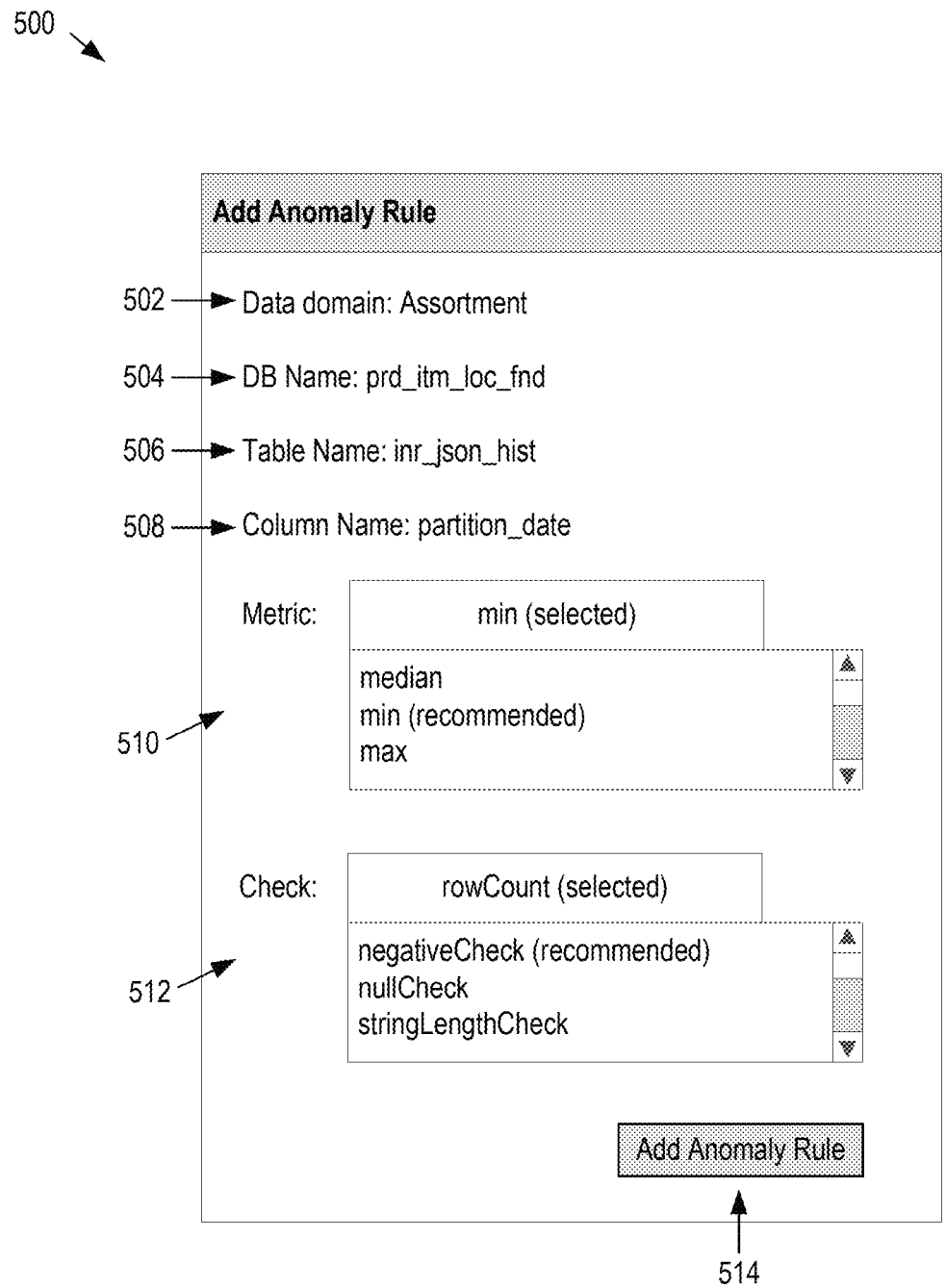
FIG. 5 illustrates an example user interface display of an "add anomaly rule" window.

FIG. 5 illustrates an example user interface display of an "add anomaly rule" window 500. In some examples, the "add anomaly rule" window may be a pop up window that may be displayed when the user selects the "add anomaly rule" option 414 on the user interface display 400 as described in FIG. 4. The "add anomaly rule" window 500 allows the user to select and add one or more anomaly rules to be executed on the set of data selected and added to the anomaly dataset table 412.

In some examples, the "add anomaly rule" window 500 includes a listing of the data domain name 502, the database name 504, the data table name 506 and the column name 508 corresponding to the anomaly dataset from the anomaly dataset table 412 that is associated with the selected "add anomaly rule" option 414. In the disclosed example from FIG. 5, the "add anomaly rule" option 414 associated with the first row of the anomaly dataset table 412 is selected and the data domain 502 corresponding to the associated anomaly data set is "Assortment," the database name 504 corresponding to the associated anomaly dataset is "prd_itm_loc_fnd," the data table name 506 corresponding to the associated anomaly dataset is "inr_j_son_hist" and the column name 508 corresponding to the associated anomaly dataset is "partition_date."

In some examples, the "add anomaly rule" window 500 also includes a metric option 510 that allows the user to select the summary metric, a check option 512 that allows the user to select an anomaly rule that should be applied to the summary metric and a "add anomaly rule" button 514 that closes the "add anomaly rule" window 500 and adds the selected anomaly rule to the anomaly dataset table 412.

In some examples, the metric option 510 may include one or more available summary metrics associated with the selected data set. The user may select a summary metric to apply the anomaly rule on from a list of available summary metrics. In the disclosed example, the list of available summary metrics associated with the selected data with the data domain 512 of "Assortment" includes "median," "min," and "max." The "min" summary metric is selected from the available summary metrics. In other examples, other types of summary metrics may also be available under the metric option 510.

In some examples, the check option 512 may include one or more available anomaly rule or anomaly check functions associated with the selected data set. The user may select a anomaly check function that can then be applied to the summary metric selected on the metric option 510 associated with the selected data set. In the disclosed example, the list of available anomaly check functions include rowCount, negativeCheck, nullCheck and stringLengthCheck. The "rowCount" anomaly check is selected from the available anomaly check functions.

In some examples, the metric option 510 may be updated to list summary metrics based on the anomaly check function that is selected by the user under the check option 512. In other examples, the check option 512 may be updated to list anomaly check functions based on the summary metric that is selected by the user under the metric option 510.

Once the user selects the metric option 510 and check option 512, the user may select the "add anomaly rule" button 514 for the selected anomaly rule to be added as a column to the anomaly dataset table 412 and executed on the associated data from the dataset table 412.

Figure 6:
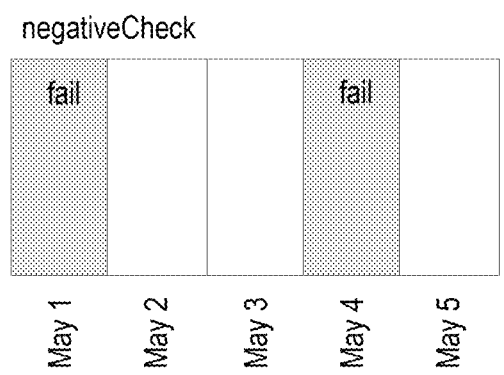
FIG. 6 illustrates an example user interface display of an anomaly detection alert.

FIG. 6 illustrates an example user interface display of an anomaly detection alert 600. For example, the anomaly detection alert 600 monitors violations of the one or more anomaly detection rules included within the anomaly dataset table 412.

In some examples, for each selected anomaly detection rule, violations to the anomaly detection rule is monitored over time. For example, the anomaly detection alert 600 displays alerts associated with violations to the anomaly rule over a period of time. In some examples, a pre-determined period of time may be divided into sections and each section may be highlighted in a manner to indicate a fail or a pass of the selected anomaly detection rule during the section of time.

For example, in the disclosed example from FIG. 6, the anomaly detection alert 600 displays alerts for each day over a period of 5 days. In other examples, the alerts may be provided for each hour, each week or each year and the overall period of time may include a week, a month or a year. Other time periods are also possible.

In the disclosed example, the anomaly detection alert 600 is associated with the anomaly detection rule "negativeCheck." In the particular example from FIG. 6, the anomaly detection alert 600 displays alerts for a period of time between May 1 and May 5. Each of the five days are indicated by a block that is uncovered to indicate that the associated dataset did not fail the negativeCheck anomaly rule or highlighted in gray to indicate that the associated dataset did fail the negativeCheck anomaly rule. In the disclosed example, the associated dataset failed to pass the negativeCheck anomaly rule on May 1 and May 4, but passed the negativeCheck anomaly rule on May 2, May 3 and May 5. Different ways of displaying passes and fails are also possible.

Figure 7:
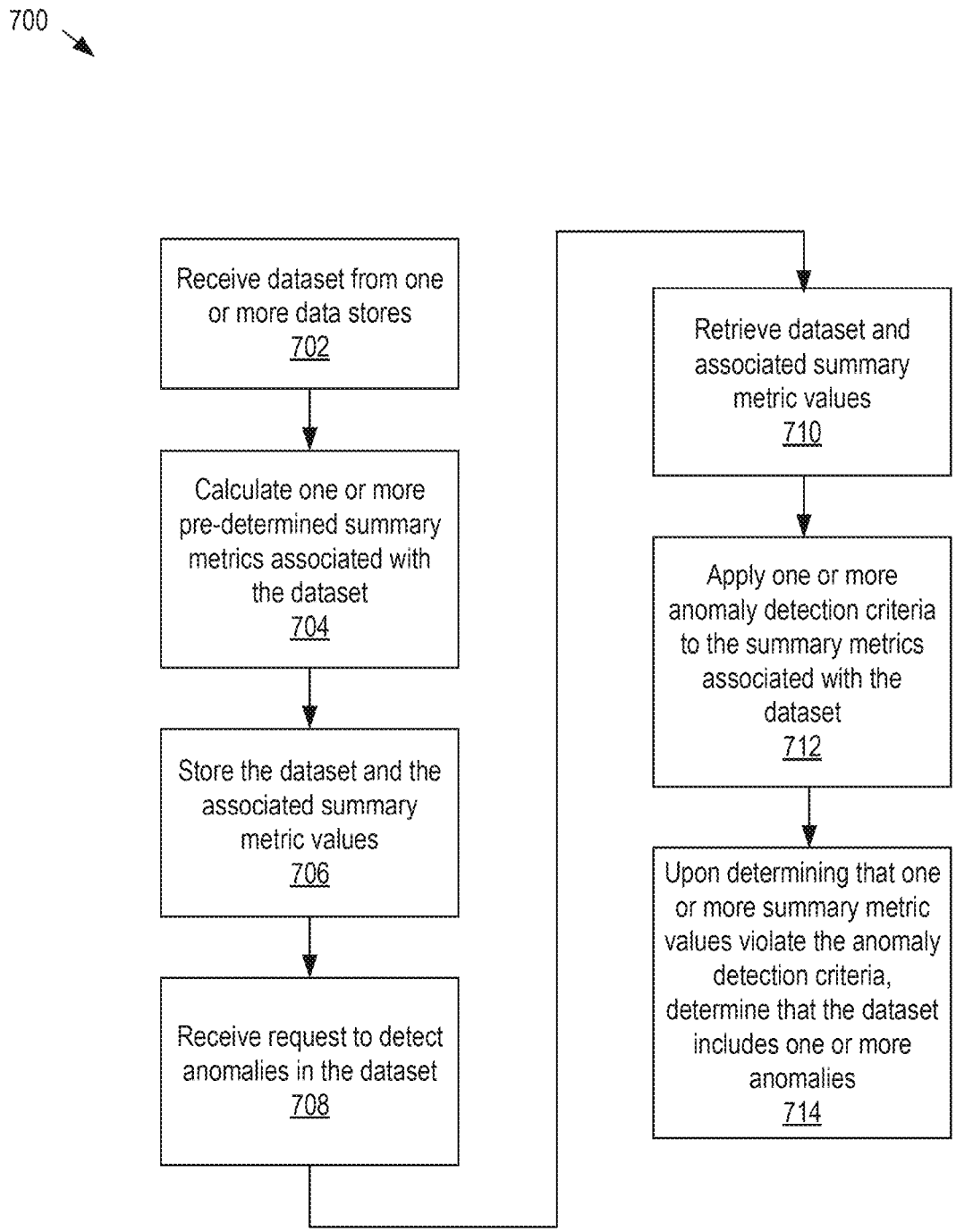
FIG. 7 illustrates a flowchart of an example set of steps executed by the data analysis module of FIGS. 1 and 2.

FIG. 7 illustrates a flowchart 700 of an example set of steps executed by the data analysis module 108.

In example operation 702, the data analysis module 108, receives a selection of a dataset from one or more data stores 110. In some examples, the user, through a user interface display generated by the data analysis module 108, may select one or more portions of one or more data tables that may be stored in one or more datastores for analysis. The selected data may be retrieved from the one or more datastores to form the selected dataset, which is then further analyzed by the data analysis module 108 as described in operations 704-714.

In example operation 704, the data analysis module 108, using the summary metric sub-module 202, calculates one or more pre-determined summary metric values associated with the selected dataset. The data analysis module 108 may include an associated configuration file that includes a list of one or more summary metric options. Upon receiving the selected dataset from the one or more data stores in operation 702, the summary metric sub-module 202 of the data analysis module 108 calculates the pre-determined summary metrics. The list of summary metrics that are listed on the configuration file associated with the data analysis module 108 is changeable by the user. The user may add, delete, or change the list of summary metrics listed on the configuration file as desired. Some example summary metrics includes min, max, median, standard deviation, correlation matrix, null count, zero value count, negative value count, etc. The summary metrics can be extended to any types of metrics based on the raw data sets and does not necessarily need to "summarize" the data set. For example, number of fast or selling items, top 100 selling items' sales number, etc would be metrics associated with a subset of the datasets and does not necessarily "summarize" the data set as a whole. Such metrics would still be considered a "summary metric."

In some examples, the process of calculating the summery metrics for one or more datasets can be implemented as a distributed process. In other words, summer metrics can be calculated using parallel processes that can each scan one or more data sets concurrently to calculate the summary metrics simultaneously.

In some examples, a tracking process may be implemented to track any updates made to the underlying data set such that example operation 704 to calculate one or more pre-determined summary metric values may be performed when an update is made to any of the underlying data sets. In such a case, the summary metric calculation operation may be an event-driven process. In other examples, the example operation 704 may be performed at pre-determined time intervals. In such a case, the summary metric calculation operation may be a periodic process. In yet other examples, other ways of driving the example operation 704 to calculate the pre-determined summary metric values is also possible.

In example operation 706, the data analysis module 108 sends the dataset and the associated summary metric values for storage in a datastore 110. Once the summary metrics are calculated for a selected dataset (as described above in relation to operation 704), the dataset and the associated summary metric values are sent to a datastore for storage. The dataset and the calculated summary metric values may also be displayed on a user interface display for the user to visually inspect the data values if the user so desires.

In example operation 708, the data analysis module 108 receives a request to detect anomalies in the dataset. The user interface display generated by the data analysis module 108 may include a selectable option for the user to analyze a dataset for anomalies. When a user selects an option to analyze a dataset for anomalies on the user interface display, the data analysis module 108 receives the request. In response to receiving the request, the data analysis module 108 may execute operations 710-514 as described below.

In example operation 710, the data analysis module 108 retrieves the dataset and the associated summary metric values from the datastore. Upon receiving the request from operation 708 to detect anomalies in a selected dataset, the data analysis module 108 retrieves the dataset and the calculated summary metric values associated with the selected dataset from the datastore.

In example operation 712, the data analysis module 108, using the anomaly detection sub-module 204, applies one or more anomaly detection criteria to the summary metrics associated with the selected dataset. The anomaly detection criteria are rules testing the validity of data and are stored in the configuration file associated with the data analysis module 108. The anomaly detection criteria can be edited to include additional criteria, remove existing criteria or alter existing criteria. The anomaly detection sub-module 204 may apply the pre-defined anomaly detection criteria to the summary metric values that were previously calculated and stored in association with the selected dataset and are not applied to the raw data entries within the dataset. Example anomaly detection criteria may include: rules to check that there are no null values in the dataset ("nullCheck"), rules to check that the values of the data entries in the dataset range between a first data value and a second data value ("rangeCheck"), rules to check that the minimum value of the dataset does not fall below zero ("negativeCheck"), rules to check that the value of the data entries in the dataset are of a certain string length ("stringLengthCheck"), rules to check that the value of the data entries in the dataset include a certain pattern of alphanumeric values ("stringRegexCheck"), rules to check that the values of the data entries in the dataset are all unique ("uniqueCheck"), etc.

In some examples, the user-defined anomaly rules can be extended to computer-created anomaly detection criteria. For example, a machine learning algorithm can be trained over time to learn the types of user-created anomaly detection criteria that are implemented to detect anomalies associated with certain types of data sets. Eventually, the machine learning algorithm can be used to make intelligent recommendations for implementing anomaly criteria for similar types of data sets.

In some examples, the anomaly detection criteria can be constructed by arbitraty combination of metrics coming from multiple datasets. For example, an inventory table metric can be mixed with sales table metric to detect out-of-stock anomalies. A rule to detect such an out-of-stock anomaly may include detecting when both the sum of sales numbers and the inventory levels are both 0, represented by the rule: sum(sales number)==0 && inventory level==0.

In example operation 714, upon determining that one or more summary metric values associated with the selected dataset violates an anomaly detection criterion, the data analysis tool 108, using the anomaly detection sub-module 204, determines that the dataset includes one or more anomalies. For example, if "negative value count" summary metric criterion (which calculates the number of data entries within the selected dataset that includes negative values) is higher than zero, then the selected dataset may violate a negativeCheck anomaly detection criterion that the dataset may not contain any negative values. The anomaly detection sub-module 204 applies the anomaly detection criteria to the one or more calculated metrics in order to determine if any summary metric value violates one or more criteria. If a summary metric value violates a criterion, then the selected dataset is determined to include at least one anomaly. The anomaly detection sub-module 204 indicates the presence of an anomaly through highlighting, change in color, use of text or symbols, or other means. The indicators are displayed in association with the selected dataset and the associated summary metric data on a user interface display generated by the data analysis module 108 for the user to identify when visually inspecting the data. The user can also be notified of the anomalies through other means, including sending the user a report with the identified anomalies. Other methods of notifying the user are also possible.

Figure 8:
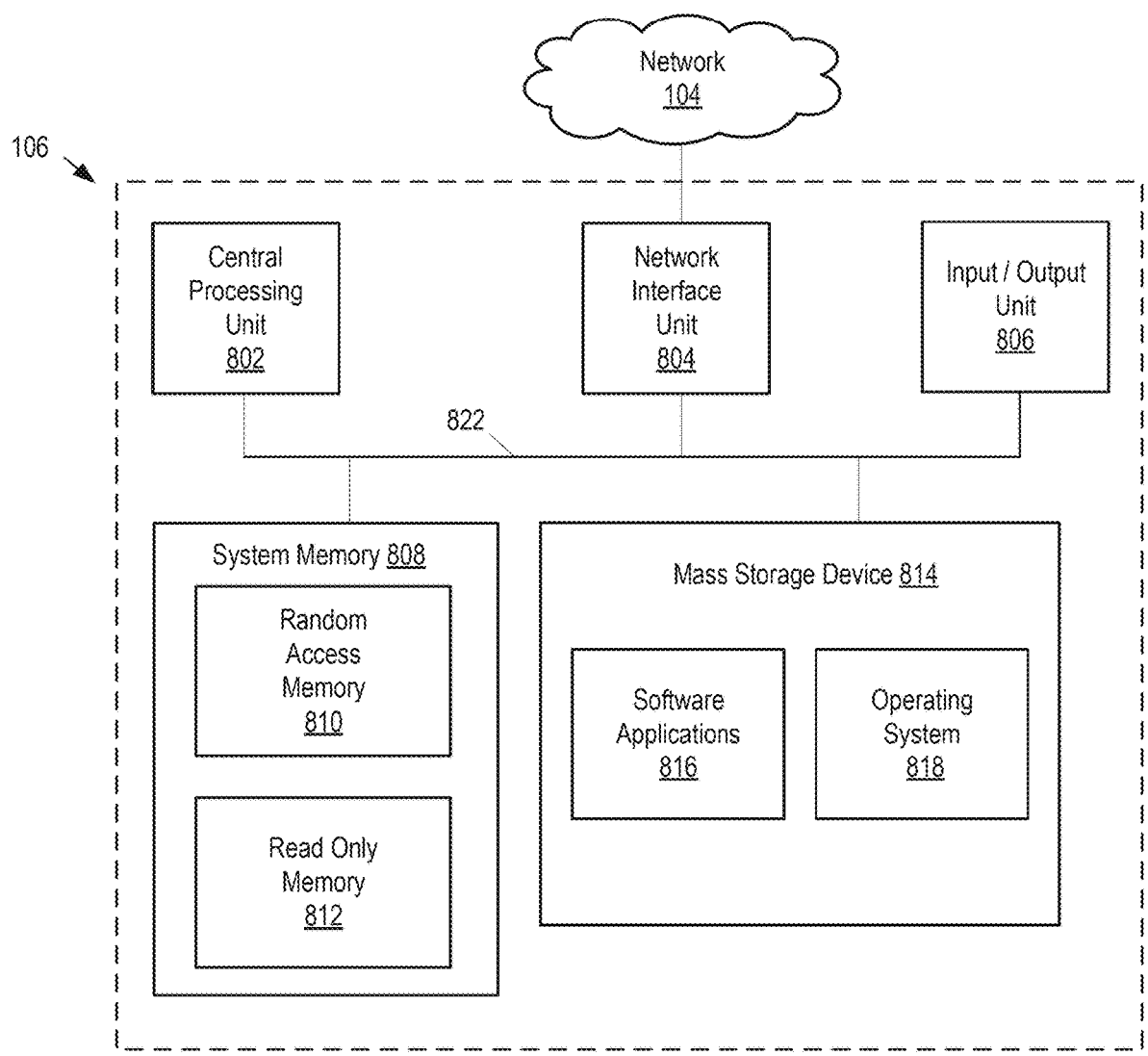
FIG. 8 illustrates example physical components of the computing devices of FIG. 1.

FIG. 8 illustrates example physical components of the computing devices of FIG. 1. As illustrated in the example of FIG. 8, the server computer 106 includes at least one central processing unit ("CPU") 802, a system memory 808, and a system bus 822 that couples the system memory 808 to the CPU 802. The system memory 808 includes a random-access memory ("RAM") 810 and a read-only memory ("ROM") 812. A basic input/output system that contains the basic routines that help to transfer information between elements within the server computer 106, such as during startup, is stored in the ROM 812. The server computer 106 further includes a mass storage device 814. The mass storage device 814 is able to store software instructions and data. Some or all of the components of the server computer 106 can also be included in user electronic computing device 102.

The mass storage device 814 is connected to the CPU 802 through a mass storage controller (not shown) connected to the system bus 822. The mass storage device 814 and its associated computer-readable data storage media provide non-volatile, non-transitory storage for the server computer 106. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central processing unit can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 106.

According to various embodiments of the invention, the server computer 106 may operate in a networked environment using logical connections to remote network devices through the network 104, such as a wireless network, the Internet, or another type of network. The server computer 106 may connect to the network 104 through a network interface unit 804 connected to the system bus 822. It should be appreciated that the network interface unit 804 may also be utilized to connect to other types of networks and remote computing systems. The server computer 106 also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the server computer 106 can store software instructions and data. The software instructions include one or more software applications 816 and an operating system 818 suitable for controlling the operation of the server computer 106. The mass storage device 814 and/or the RAM 810 also store software instructions, that when executed by the CPU 802, cause the server computer 106 to provide the functionality of the server computer 106 discussed in this document. For example, the mass storage device 814 and/or the RAM 810 can store software instructions that, when executed by the CPU 802, cause the server computer 106 to display received data on the display screen of the server computer 106.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method for analyzing a dataset, the method comprising:
   receiving, by a user, a selection of a dataset for analysis, wherein the dataset includes a plurality of data values, wherein the dataset comprises at least a portion of one or more data tables, and each of the one or more data tables includes a plurality of rows and columns of data entries;
   retrieving the selected dataset from one or more heterogeneous data sources;
   calculating one or more summary metrics associated with the dataset, wherein the summary metrics provide a summary of property of the plurality of data values;
   storing the dataset and the one or more summary metrics in a data store;
   dynamically updating the one or more summary metrics in the data store in response to updates to the stored dataset;
   generating a data analysis user interface for display on a user device, wherein the user interface includes at least a portion of the stored dataset and the one or more calculated summary metrics for visual inspection from the user;
   receiving a request, from the user, through the user interface to detect any anomalies in the dataset;

applying one or more anomaly detection criteria to the one or more summary metrics associated with the dataset without evaluating the plurality of data values within the dataset, wherein the applying one or more anomaly detection criteria includes applying one or more pre-defined rules to the one or more summary metrics to determine whether the one or more summary metrics violate the one or more pre-defined rules;

determining whether at least one of the one or more summary metrics violates at least one of the one or more pre-defined rules over a time period including a plurality of time sections; and in response to determining that at least one of the one or more summary metrics violates the at least one of the one or more pre-defined rules, determining that the dataset includes an anomaly; and displaying an alert to the user on the user interface indicating a presence of the anomaly within the dataset, wherein the alert includes the plurality of time sections with at least the determined anomaly identified in association with a respective time section.

2. The method of claim 1, further comprising:
generating the graphical user interface for display on a user device, the graphical user interface including:
one or more options to select the dataset from the one or more data sources; and
a display portion that displays the dataset.

3. The method of claim 2, wherein the display portion also displays the one or more summary metrics associated with the dataset.

4. The method of claim 2, wherein the display portion also displays one or more visual indicators that the dataset includes one or more anomalies.

5. The method of claim 1, wherein the one or more data sources include one or more databases.

6. The method of claim 1, wherein the one or more summary metrics include at least one of: minimum, maximum, mean, standard deviation, null value count, zero value count and negative value count.

7. A data analysis system comprising:
a hardware processor;
a memory storing instructions that when executed by the hardware processor cause the hardware processor to:
receive, by a user, a selection of a dataset for analysis, wherein the dataset includes a plurality of data values, wherein the dataset comprises at least a portion of one or more data tables, and each of the one or more data tables includes a plurality of rows and columns of data entries;
retrieve the selected dataset from one or more heterogeneous data sources;
receive the dataset from one or more data sources, wherein the dataset includes a plurality of data values;
calculate one or more summary metrics associated with the dataset,
wherein the summary metrics provide a summary of property of the plurality of data values;
store the dataset and the one or more summary metrics in a data store;
dynamically update the one or more summary metrics in the data store in response to updates to the stored dataset;
generate a data analysis user interface for display on a user device, wherein the user interface includes at least a portion of the stored dataset and the one or more calculated summary metrics for visual inspection from the user;
receive a request, from the user, through the user interface to detect any anomalies in the dataset;
apply one or more anomaly detection criteria to the one or more summary metrics associated with the dataset without evaluating the plurality of data values within the dataset, wherein the applying one or more anomaly detection criteria includes applying one or more pre-defined rules to the one or more summary metrics to determine whether the one or more summary metrics violate the one or more pre-defined rules;
determine whether at least one of the one or more summary metrics violates at least one of the one or more pre-defined rules over a time period including a plurality of time sections; and
in response to determining that at least one of the one or more summary metrics violates the at least one of the one or more pre-defined rules, determine that the dataset includes an anomaly; and
display an alert to the user on the user interface indicating a presence of the anomaly within the dataset, wherein the alert includes the plurality of time sections with at least the determined anomaly identified in association with a respective time section.

8. The data analysis system of claim 7, wherein the memory storing instructions that when executed by the processor further cause the processor to:
generate the graphical user interface for display on a user device, the graphical user interface including:
one or more options to select the dataset from the one or more data sources; and
a display portion that displays the dataset.

9. The data analysis system of claim 8, wherein the display portion also displays the one or more summary metrics associated with the dataset.

10. The data analysis system of claim 8, wherein the display portion also displays one or more visual indicators that the dataset includes one or more anomalies.

11. The data analysis system of claim 7, wherein the one or more data sources include one or more databases.

12. The data analysis system of claim 7, wherein the one or more summary metrics include at least one of: minimum, maximum, mean, standard deviation, null value count, zero value count and negative value count.

13. The data analysis system of claim 12, wherein the one or more anomaly detection criteria are defined in a configuration file associated with the data analysis system.

14. A non-transitory computer-readable medium having instructions stored thereon, the instructions being executable by a computer processor to implement the following steps:
receiving, by a user, a selection of a dataset for analysis, wherein the dataset includes a plurality of data values, wherein the dataset comprises at least a portion of one or more data tables, and each of the one or more data tables includes a plurality of rows and columns of data entries;
retrieving the selected dataset from one or more heterogeneous data sources;
calculating one or more summary metrics associated with the dataset, wherein the summary metrics provide a summary of property of the plurality of data values;
storing the dataset and the one or more summary metrics in a data store;

dynamically updating the one or more summary metrics in the data store in response to updates to the stored dataset;

generating a data analysis user interface for display on a user device, wherein the user interface includes at least a portion of the stored dataset and the one or more calculated summary metrics for visual inspection from the user;

receiving a request, from the user, through the user interface to detect any anomalies in the dataset;

applying one or more anomaly detection criteria to the one or more summary metrics associated with the dataset without evaluating the plurality of data values within the dataset, wherein the applying one or more anomaly detection criteria includes applying one or more pre-defined rules to the one or more summary metrics to determine whether the one or more summary metrics violate the one or more pre-defined rules;

determining whether at least one of the one or more summary metrics violates at least one of the one or more pre-defined rules over a time period including a plurality of time sections; and in response to determining that at least one of the one or more summary metrics violates the at least one of the one or more pre-defined rules, determining that the dataset includes an anomaly; and displaying an alert to the user on the user interface indicating a presence of the anomaly within the dataset, wherein the alert includes the plurality of time sections with at least the determined anomaly identified in association with a respective time section.

* * * * *